No. 726,025. PATENTED APR. 21, 1903.
H. G. CADY.
CARPET OR RUG BEATER.
APPLICATION FILED MAR. 26, 1901.
NO MODEL.

Witnesses:
Frank E. Cady
Chas. A. Wright

Inventor:
Horace G. Cady

UNITED STATES PATENT OFFICE.

HORACE G. CADY, OF AUBURN, NEW YORK.

CARPET OR RUG BEATER.

SPECIFICATION forming part of Letters Patent No. 726,025, dated April 21, 1903.

Application filed March 26, 1901. Serial No. 53,013. (No model.)

*To all whom it may concern:*

Be it known that I, HORACE G. CADY, a citizen of the United States, residing at Auburn, in the county of Cayuga and State of New York, have invented a new and useful Improvement in Carpet or Rug Beaters, of which the following is a specification, reference being had to the accompanying drawings, on one sheet, making part of this specification, in which—

Figure 1:
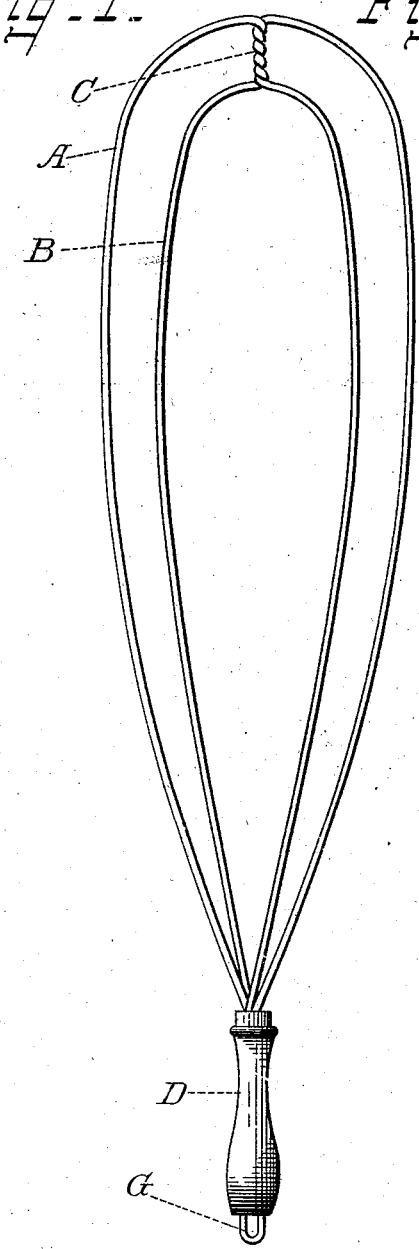
Figure 2:
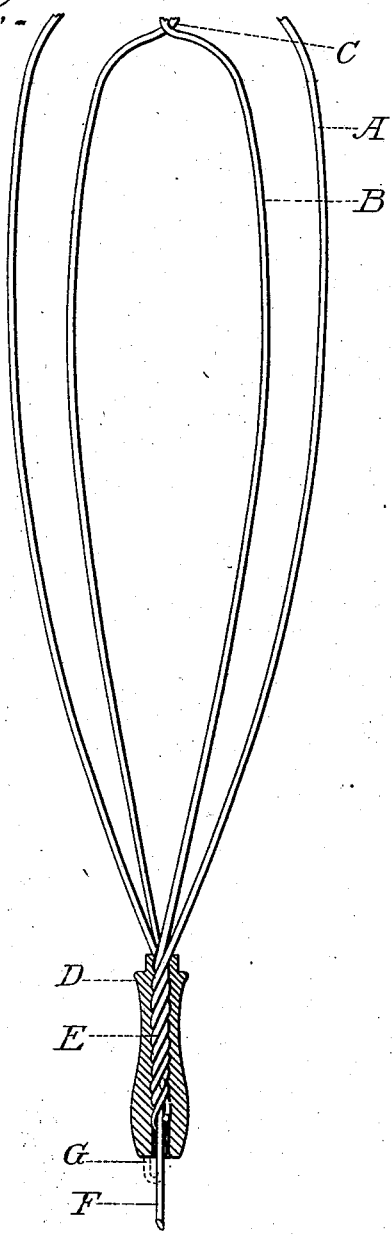

Figure 1 is a plan view of my carpet and rug beater; and Fig. 2 is a view similar to Fig. 1, but showing the handle of the beater in section.

Similar letters of reference refer to similar parts in both views.

My invention relates to improvements in carpet and rug beaters in which two wire loops are used, an outer loop A and an inner loop B, securely held in their relative positions by suitable connections, the ends of said wires being secured together at E within a handle D for operating the same. I accomplish this preferably by twisting two wires of suitable length together near the centers thereof and bending the longer parts thereof to form the outer loop A and the shorter parts thereof to form the inner loop B, the twisted part C forming a suitable connection for holding the outer and the inner loops A and B, respectively, in their relative positions at the outer end, the four ends of the wires being brought together and twisted together in a shank E to secure the inner ends of the loops A B in their relative positions, the twisted ends of said wires forming a suitable shank E for the handle D, the four ends of said wires being so adjusted that all enter the handle twisted together, one end F of said wires being longer than the others, so that it extends beyond the twisted part of said wires and passes clear through the handle for the purpose of holding the handle permanently in its place. This is preferably accomplished by bending the end F of the wire which passes through the handle over in suitable form against the outer end of the handle, as seen at G, Figs. 1 and 2.

The objects of my invention are to so arrange and construct said carpet and rug beater by twisting two wires together near the middle of each of said wires that the twisted part C will form a bridge or brace connecting said wires rigidly together and maintaining a relative position between the loops formed by said wires and also to bring the ends of said wires and twist them in such a manner to form two loops, an outer loop A and an inner loop B, the ends of said wires being twisted together in such a manner as to hold and maintain said loops in relative position to each other, the ends of said wires being twisted together in such a manner as to make a rigid shank E to receive the handle D, which is securely held in place by the wire projection F, as shown, thereby forming a rigid and simple device for the purpose of beating rugs, carpets, and other articles, affording ample surface contact in operating the device upon the article to be whipped, also affording a strong and rigid shank E, to which the handle D is firmly fastened.

Having thus described my invention, what I claim, and desire to secure by Letters Patent of the United States, is—

In a carpet and rug beater, wires bent to form loops twisted together at their middle portions, the ends of said wires twisted to form a shank and a handle secured on such shank in the manner and for the purpose as described.

HORACE G. CADY.

Witnesses:
FRANK E. CADY,
WILLARD CALDWELL.